May 25, 1965  N. BRADLEY  3,185,632
FUEL ELEMENTS FOR NUCLEAR REACTORS

Filed June 2, 1960  3 Sheets-Sheet 3

United States Patent Office 3,185,632
Patented May 25, 1965

3,185,632
FUEL ELEMENTS FOR NUCLEAR REACTORS

Norman Bradley, Culcheth, Warrington, England, assignor to United Kingdom Atomic Energy Authority, London, England
Filed June 2, 1960, Ser. No. 33,554
Claims priority, application Great Britain, June 29, 1959, 22,194/59
4 Claims. (Cl. 176—68)

This invention relates to fuel element assemblies for nuclear reactors, that is to say a plurality of sheathed nuclear fuel members forming a cluster, the individual fuel members of the cluster being spaced from one another by spacing members which may take the form of grid-like structures.

When such fuel element assemblies are loaded in a nuclear reactor and swept by a flow of coolant, local overheating can result where the fuel members touch or are close to the spacing members.

It therefore becomes an object of the invention to provide a fuel element assembly less susceptible to overheating in the region of the spacing members.

According to the invention, a fuel element assembly for a nuclear reactor comprises a tubular member, a cluster of sheathed nuclear fuel members mounted in said tubular member, spacing members attached to said tubular member for spacing the sheathed fuel members relative to one another and portions of heat-insulating, non-fissile material dividing the nuclear fuel in the sheathed fuel members into sections, the heat-insulating, non-fissile material being disposed in register with the spacing members.

An embodiment of the invention will now be described by way of example with reference to the accompanying drawings, wherein.

Figure 1:
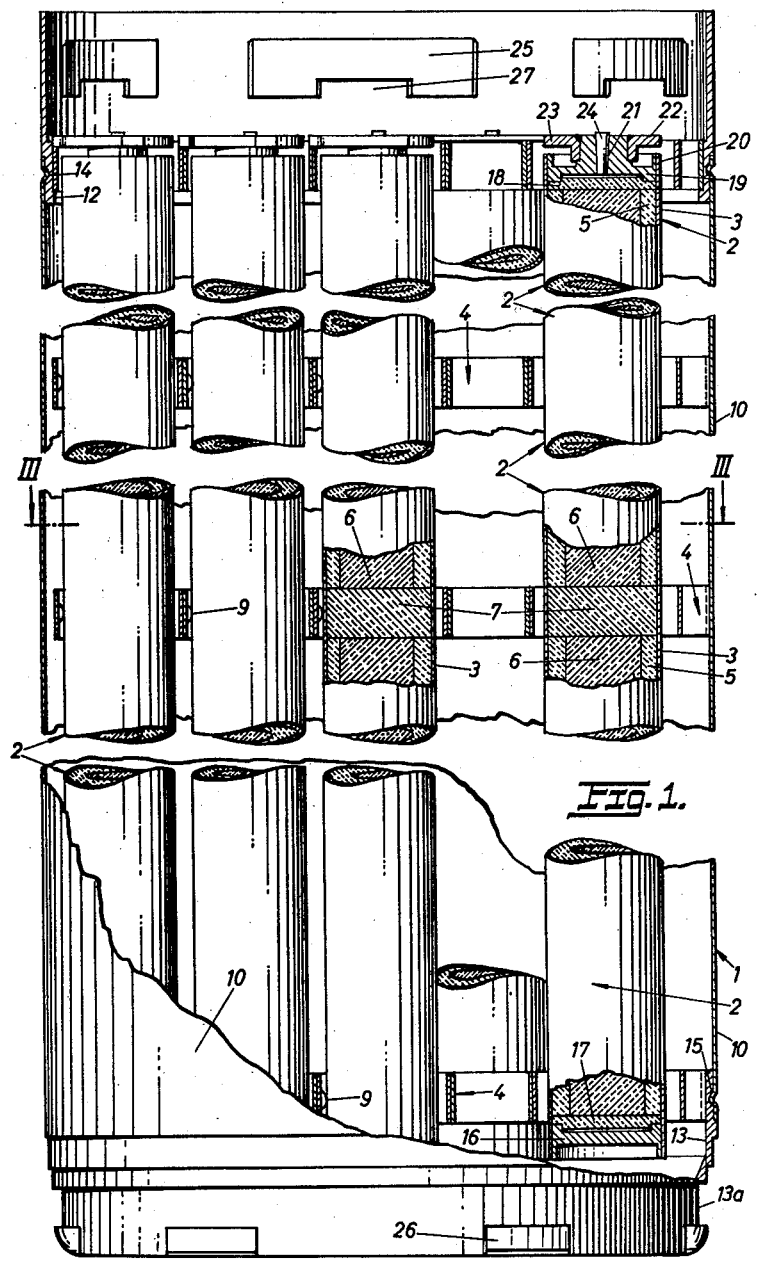
FIGURE 1 is a fragmentary side view in section on line I—I of FIGURE 2 and illustrates a fuel element according to the invention.

Referring to the drawings, a fuel element assembly 1 for a nuclear reactor has a cluster of nineteen sheathed nuclear fuel members 2 each comprising a column of short rods 5 of uranium oxide in a close-fitting stainless steel sheath 3, the members 2 being located within spacing members 4 each of hexagonal, grid-like form. The members 4 are attached to the interior of a stainless steel tubular housing 10 at spaced intervals. The hollow portions of the tubular fuel rods 5 have magnesium oxide fillings 6 and magnesium oxide discs 7 divide the columns of rods 5 into sections, the discs 7 being disposed between the sections and in register with the spacing members 4 (see particularly FIGURE 1).

Figure 3:
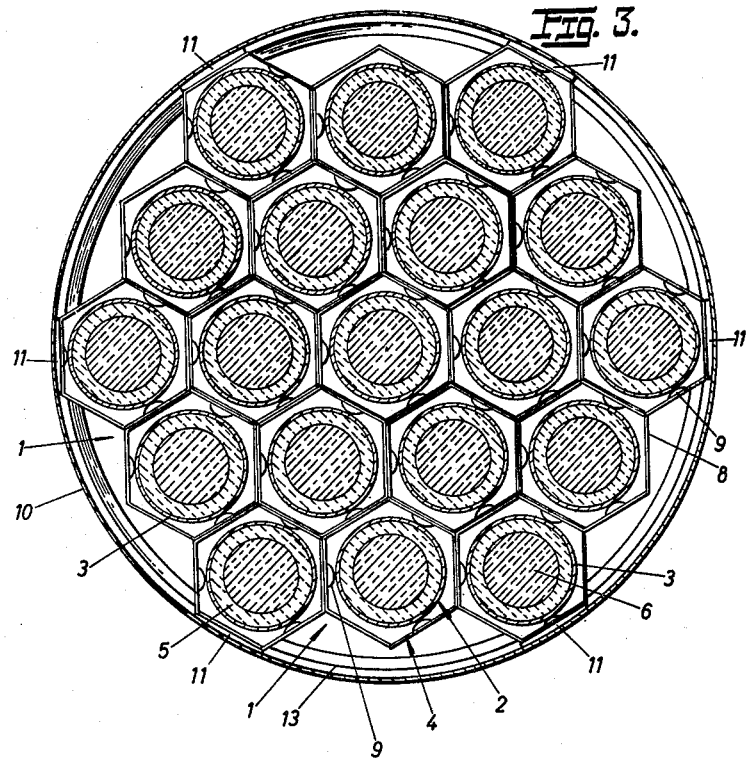
FIGURE 3 is a plan view in section on line II—II of FIGURE 1.

Each spacing member 4 has nineteen sleeves 8 of hexagonal section welded together to form the structure as can clearly be seen in FIGURE 3. The sleeves 8 are indented to provide projections 9 which serve to centralise the fuel members 2 within the sleeves 8.

The upper and lower ends of the tubular housing 10 are reinforced by internal rings 12 and 13 respectively of stainless steel. The outer face of the ring 12 has an annular groove 14 into which part of the upper end of the tubular housing 10 is fitted. Similarly, the outer face of the ring 13 has an annular groove 15 in which part of the lower end of the housing 10 is fitted. The rings 12, 13 also provide support for the upper and lower spacers 4 and are secured thereto by spot-welding. (Alternatively, the rings 12, 13 may be spot welded to their respective ends of the housing 10.) The intermediate spacers 4 are spot-welded to support strips 11 (FIGURE 3) which in turn are spot-welded to the inner walls of the tubular housing 10.

The inner walls of the ring 12 at the upper end of the housing 10 carry a number of equi-spaced stainless steel plates 25 and the outer walls of a stepped extension 13a of the ring 13 at the lower end of the housing 10 carry a number of equi-spaced stainless steel plates 26. The plates 25, 26 are spot-welded to the ring 12 and ring extension 13a respectively and the plates 26 are disposed in register with the spaces between the plates 25. The plates 25 have recesses 27 on their lower faces 28, the recesses 27 being of slightly greater width than that of the plates 25.

The fuel element assembly 1 may be end-connected with similar fuel element assemblies. This allows an interconnected "string" of such fuel element assemblies to be loaded into a vertically orientated fuel element coolant channel or pressure tube of a nuclear reactor and also allows "axial inversion" of the fuel element asemblies of a "string." (Axial inversion is the interchanging of relative positions of the fuel element assemblies of a "string," to equalise irradiation.)

To inter-connect two fuel element assemblies 1, the lower end of one fuel element assembly is inserted in upper end of the other so that the plates 26 of the first assembly first move between the plates 25 of the other. Rotation of one fuel element assembly relative to the other then brings the plates 26 of the first assembly to the underside of the plates 25 of the second assembly where they locate in the recesses 27.

The "string" of inter-connected fuel element assemblies 1 is supported at its uper end by an extension sleeve having a lower end similar to the lower end of a fuel element assembly 1, engaging with the upper end of the upper fuel element assembly of the "string." The extension sleeve has a lifting head and both guide and locating splines so that as it is lowered into the reactor coolant channel or pressure tube it locates itself by the guide splines directing the locating splines into appropriate recesses at the top of the reactor coolant channel or pressure tube. (A full description of inter-connection and support of fuel element assemblies such as the fuel element assembly 1 is given in my co-pending application Serial No. 848,720, filed October 26, 1959, now U.S. Patent 3,091,582; see particularly FIGURES 5 to 12).

Figure 2:
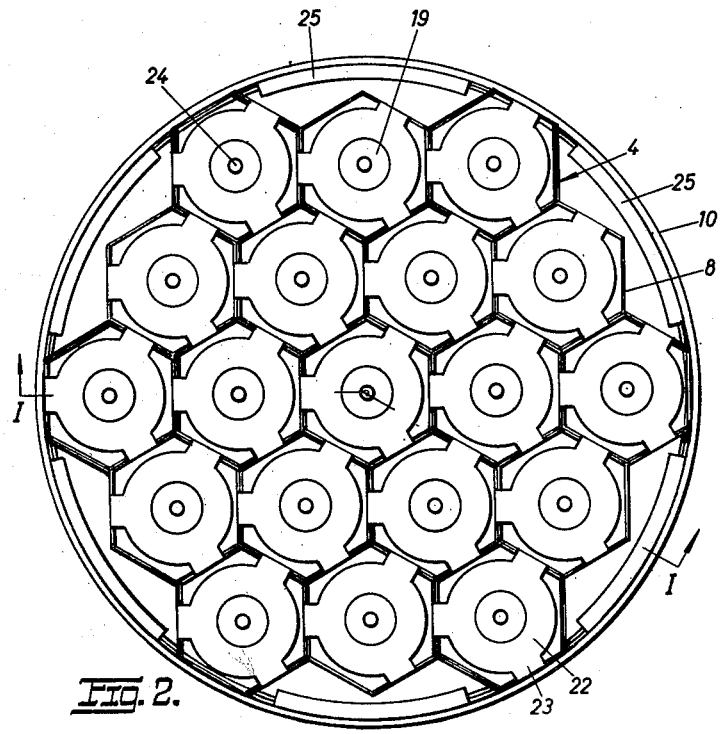
FIGURE 2 is a plan view of FIGURE 1.

Each fuel member 2 has a lower end cap 16, the lower edge of which is welded to the lower end face of the sheath 3. A magnesium-oixde insulating disc 17 spaces the fuel rods 5 from the end cap 16. A further magnesium oxide insulating disc 18 spaces the uppermost fuel rod 5 from an upper end cap 19 inserted into the open end of the sheath 3. The upper edge of a flanged portion 20 of the end cap 19 is welded to the upper end of the sheath 3. The end cap 19 has a hole 21 of slight taper and carries a plate 22 having radial projections 23 (see particularly FIGURE 2). The fuel members 2 are suspended within the housing 10 by the projections 23 which bear upon the uppermost spacing member 4. After assembly of the fuel members 2, the interior of each fuel member is first purged by means of argon gas supplied to the fuel member interior through the hole 21 in the end cap 19 and then sealed by a taper pin 24 driven into the hole 21.

When the fuel element assembly 1 is loaded in a reactor and swept by coolant, the nuclear heat generated within the fuel rods 5 of the fuel members 2 is conducted through the sheaths 3 to be given up to the coolant. Although coolant flow is restricted where the sheaths 3 are in contact with or close to the projections 9 of the spacing members 4, overheating should not take place as the discs 7 do not generate heat and are poor conductors of heat from the adjacent fuel rods 5.

I claim:

1. A nuclear fuel assembly comprising a tubular coolant conducting housing, a cluster of elongate fuel members disposed in parallel array longitudinally within the housing, fuel member end-support means carried by the housing, and at least one fuel member spacing structure of grid-form disposed transverse the housing intermediate the ends of the fuel members and defining with adjacent parts of said fuel members passages for coolant flow along the fuel members, said fuel members each comprising a tubular sheath, and a stack of bodies enclosed by the sheath, said bodies being of non-fissile, heat insulating material in the plane of said spacing structure and of fissile material outside the plane of said spacing structure.

2. A nuclear fuel assembly comprising a tubular coolant conducting housing, a cluster of elongate fuel members disposed in parallel array longitudinally within the housing, fuel member end-support means carried by a support structure, at least one fuel member spacing structure of grid-form disposed transverse the housing intermediate the ends of the fuel members and defining with adjacent parts of the fuel members passages for coolant flow along the fuel members, said fuel members each comprising a tubular sheath, a column of nuclear fuel enclosed by the sheath and a plug of heat-insulating, non-fissile material dividing said column into end-spaced sections, said plug being disposed in the plane of the said spacing structure.

3. A nuclear fuel assembly comprising a tubular coolant conducting housing, a first grid structure disposed transverse said housing, a second grid structure disposed transverse said housing and spaced from the first grid structure, said first and second grid structures each defining a lattice of apertures wherein an aperture of one grid structure is in longitudinal alignment with an aperture of the other grid structure, a plurality of elongate fuel members disposed within the housing and extending longitudinally through the aligned apertures of the first and second grid structures and defining with said apertures passages for coolant flow along said fuel members, support means connecting the fuel members with the first grid structure, said fuel members each comprising a tubular sheath, a column of nuclear fuel enclosed by the sheath and a plug of heat-insulating, non-fissile material disposed in the plane of the second grid structure to divide said column into end-spaced sections disposed one on each side of said second grid structure.

4. A fuel assembly as claimed in claim 3 wherein said second grid structure defines lateral projections for support of the fuel members extending therethrough.

References Cited by the Examiner

UNITED STATES PATENTS

| | | | |
|---|---|---|---|
| 2,505,695 | 4/50 | Villiger et al. | |
| 2,778,792 | 1/57 | Szilard | 176—30 X |
| 2,864,758 | 12/58 | Shackelford | 176—83 |
| 2,869,836 | 1/59 | Hult. | |
| 2,999,059 | 9/61 | Treshow | 176—42 |
| 3,015,616 | 1/62 | Sturtz et al. | 176—78 |
| 3,033,773 | 5/62 | Schluderberg et al. | 176—43 |
| 3,068,163 | 12/62 | Currier et al. | 176—78 |
| 3,105,026 | 9/63 | Dickson | 176—68 |

FOREIGN PATENTS

| | | |
|---|---|---|
| 1,207,188 | 8/59 | France. |
| 1,045,563 | 12/58 | Germany. |
| 553,485 | 5/43 | Great Britain. |
| 784,890 | 10/57 | Great Britain. |

CARL D. QUARFORTH, *Primary Examiner.*

OSCAR R. VERTIZ, ROGER L. CAMPBELL,
*Examiners.*